(No Model.) 2 Sheets—Sheet 1.
H. BORMANN.
APPARATUS FOR MAKING SILICA COATED OR OTHER SHINGLES.
No. 455,271. Patented June 30, 1891.
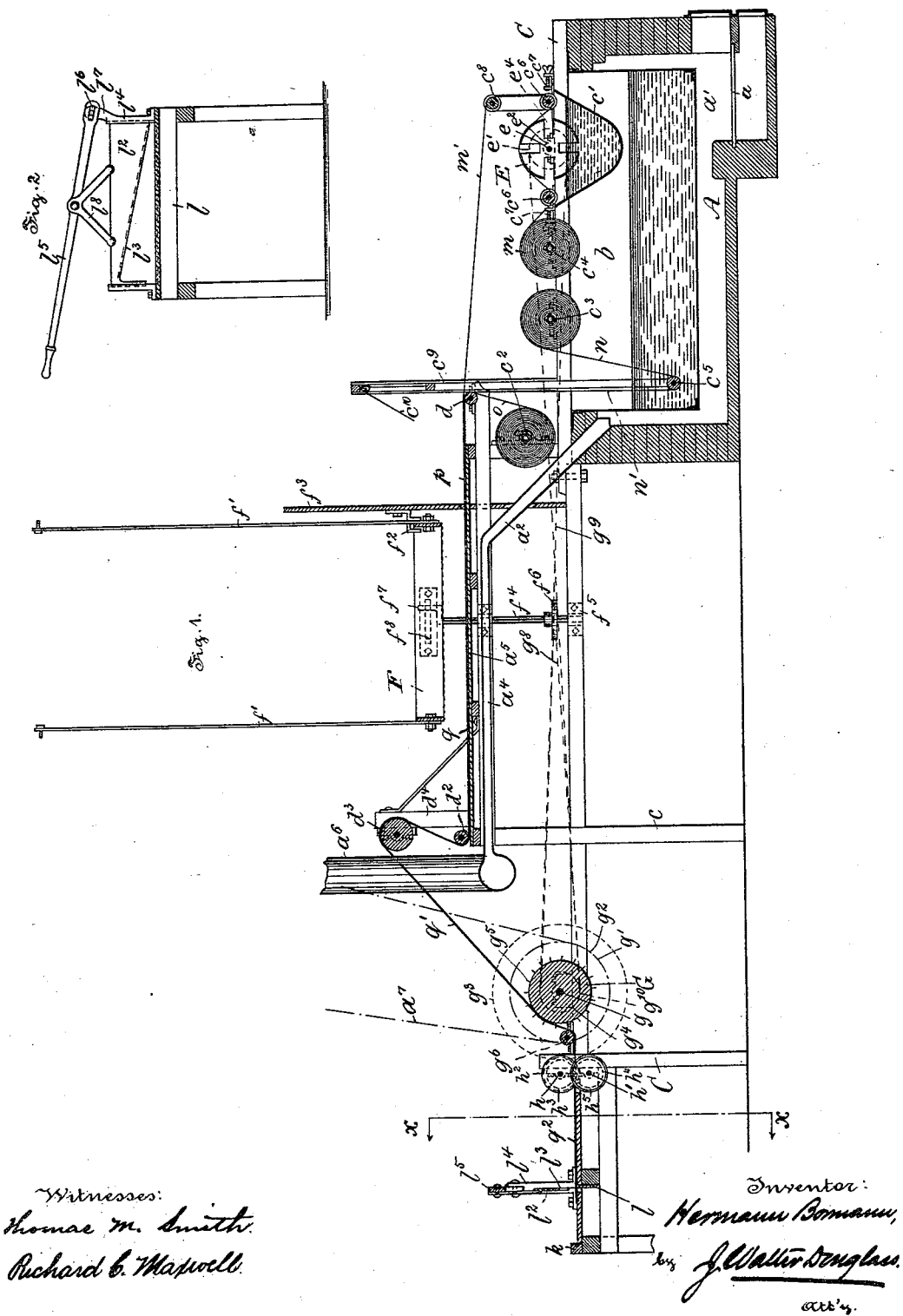

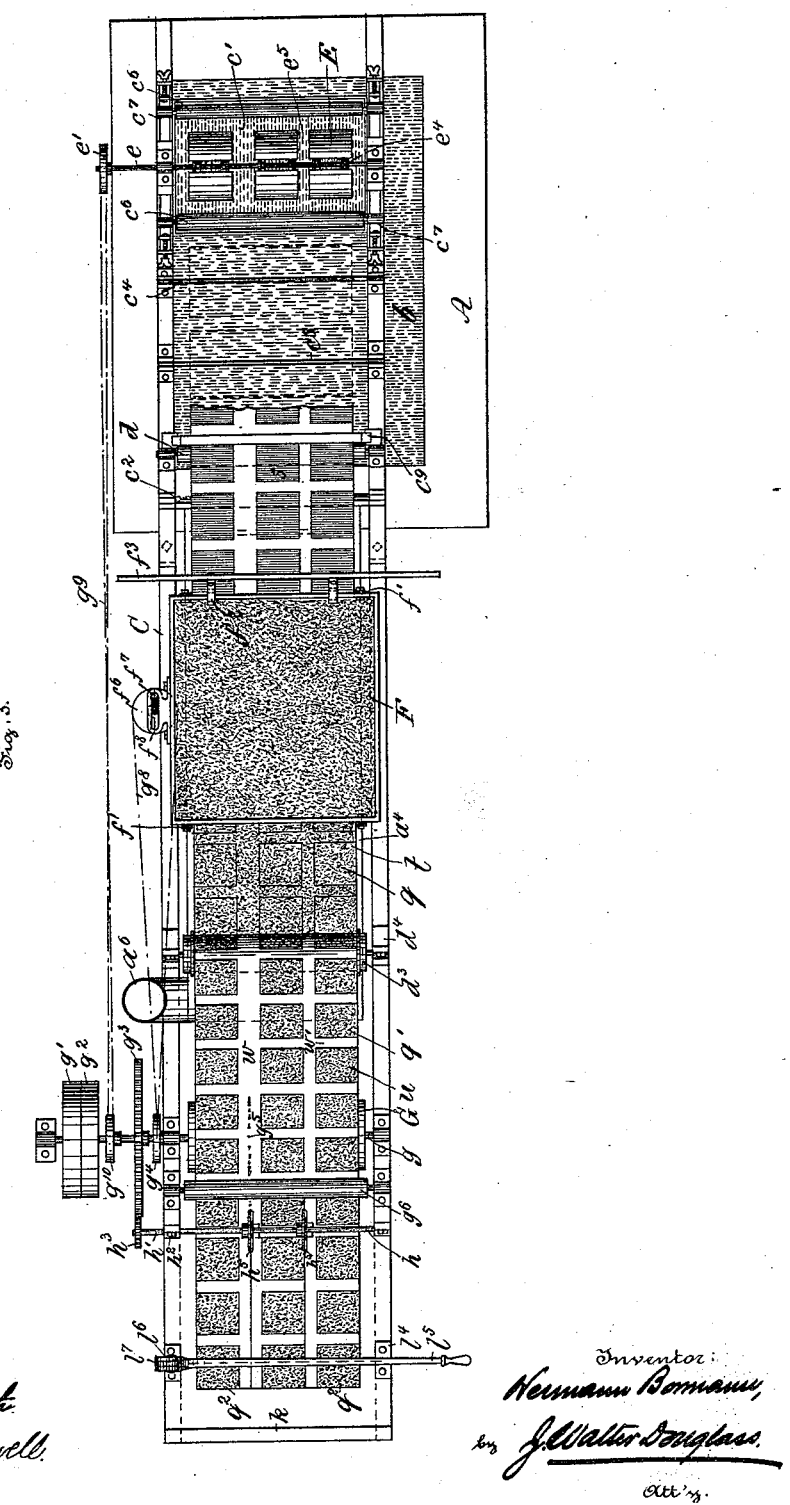

UNITED STATES PATENT OFFICE.

HERMANN BORMANN, OF PHILADELPHIA, PENNSYLVANIA, ASSIGNOR TO J. WALTER DOUGLASS, OF SAME PLACE.

APPARATUS FOR MAKING SILICA-COATED OR OTHER SHINGLES.

SPECIFICATION forming part of Letters Patent No. 455,271, dated June 30, 1891.

Application filed November 12, 1890. Serial No. 371,145. (No model.)

*To all whom it may concern:*

Be it known that I, HERMANN BORMANN, a subject of the Emperor of Germany, but now residing at the city of Philadelphia, in the county of Philadelphia and State of Pennsylvania, have invented certain new and useful Improvements in Apparatus for Making Silica-Coated or other Shingles with or without Marginal Edges, of which the following is a specification.

My present invention relates in general to the manufacture of single or multiple ply roofing-shingles from tar-paper, saturated felt, and similar material or materials, but more particularly to the manufacture of silica-coated shingles with one or more plain or uncoated edges.

The principal object of my present invention is to provide comparatively simple and efficient apparatus for making single or multiple ply uncoated roofing-shingles or silica-coated shingles, with or without plain-surfaced or uncoated marginal edges, from tar-paper, felt, and the like.

My invention consists of a novel arrangement of apparatus especially adapted for making shingles, and such apparatus having relation, first, to the utilization of the products of combustion for warming the fabric during the operation of applying silica or other material or materials thereto; second, to means for coating portions of the surface of the fabric with pitch or other adhesive substance or material in a heated condition; third, to means for permitting of the removal of the silica or analogous material from the uncoated portions of the fabric; fourth, to means for positively and continuously feeding said fabric to suitable and positively-driven cutters for separating the same longitudinally and between the silica-coated portions into strips having an uncoated marginal edge or edges, and, fifth, to means for intermittently cutting said strips transversely into shingles; and my invention further consists in the improvements hereinafter described, and particularly pointed out in the claims.

In order that the invention may be fully understood, a brief description of the process of manufacturing the principal types of such shingles will now be given.

The process of manufacturing plain-surfaced or uncoated single-ply-fabric shingles is as follows: A web or sheet of saturated fabric, as tar-paper, is drawn from a spool or bobbin and advanced by a continuous and positive feed to rotary or other suitable mechanical cutters, which separate the same longitudinally into strips. These strips are then cut transversely of the direction of the cutting-edges of the above-mentioned cutters by means of a knife-edge or other suitable device adapted to be operated intermittently, whereby the strips are cut up into squares or parallelograms, and may be removed for use as roofing-shingles and other purposes.

In making multiple-ply-fabric shingles one or more surfaces of several sheets or webs of saturated fabric, as tar-paper or felt, are coated with an adhesive substance or material, as pitch in a heated condition, either by drawing them through vats or tanks containing such material or by applying the material to the surfaces thereof by means of coating-rolls or other suitable appliances. The coated sheets, while maintained in a heated condition, are superposed the one upon the other with the coated surfaces thereof in contact, and are united by pressure and tension, and the united sheet is continuously cut longitudinally into strips, and these strips are intermittently cut transversely into shingles in the manner above described.

In making silica-coated shingles having a plain-surfaced or uncoated side or marginal edge or edges, the face-ply of a single or multiple ply fabric is continuously coated longitudinally in stripes with adhesive material, as pitch in a heated condition, either by means of a positively-driven sectional or recessed coating-roller or in any other convenient manner, and while the fabric is maintained in a heated condition the upper surface thereof is coated with silica, which of course becomes embedded in or attached to the adhesive stripes and rests loosely upon the spaces between them. The superfluous silica is then permitted to fall from the uncoated spaces between the stripes by gravity, or is otherwise removed from the uncoated portions thereof. The fabric is continuously advanced by a positive feed moving synchronously with the coating-roll, if that was the instrument employed for applying the adhesive material, and is cut longitudinally and between the silica-coated stripes into strips, and these strips are cut transversely and intermittently into shingles having a plain-surfaced or uncoated side or marginal edge or edges in the manner above set forth.

In making silica-coated shingles having two or more plain-surfaced or uncoated side and end marginal edges the surface of the fabric is coated with an adhesive substance, as pitch in a melted condition, in squares or parallelograms disposed in straight lines and having uncoated spaces extending lengthwise and crosswise between them, and while the fabric is maintained in a heated condition silica is deposited upon the partially-coated surface, and of course becomes embedded in and attached to the adhesive squares or parallelograms, but rests loosely upon the uncoated transverse and longitudinal spaces. The superfluous silica is permitted to fall by gravity or is otherwise removed from the uncoated spaces. The fabric is then cut longitudinally and between the silica-coated squares or parallelograms into strips, and these strips are cut transversely and between the silica-coated squares or parallelograms into shingles.

It may be remarked that the shingles may be provided on all the sides and edges thereof with marginal uncoated or plain-surfaced spaces by cutting in the center of the uncoated spaces between the silica-coated squares or parallelograms; but preference is given to the employment of shingles having marginal uncoated spaces on one side and the adjacent end thereof, and this latter result is attained in practice by cutting to one side of the center of the uncoated spaces and near to the silica-coated squares or parallelograms.

In the accompanying drawings, which show an organized plant especially adapted for carrying my invention into effect, Figure 1 represents a transverse longitudinal section through an organized plant for continuously producing silica-coated and other shingles with or without a marginal edge or edges. Fig. 2 represents a transverse section therethrough on the line $x\,x$ of Fig. 1, and Fig. 3 represents a top or plan view of Fig. 1.

Referring to the drawings for a further description of my invention, A is a brick or other suitable form of furnace provided with a grate $a$ in the lower part thereof, and with a chamber $a'$, located above said grate, and in which is mounted a heating-tank $b$, adapted to contain an adhesive substance or material, as pitch.

$a^2$ is a draft-flue of rectangular cross-section equal in width to the width of the machine. This flue $a^2$ is connected with the furnace, and extends upward and then horizontally, as at $a^4$, in order to impart the initial heat of the products of combustion to a table $a^5$, for a purpose to be presently described.

$a^6$ is a pipe communicating with the flue $a^2$ and extending upward through the ceiling or roof of the building into the open air.

C is a horizontal rectangular frame resting upon the side and end walls of the furnace A, and also supported by posts or pillars $c$. This frame C is provided with a vat $c'$, depending from the under side thereof into the heating-tank $b$ of the furnace A and adapted to contain heated pitch or other adhesive material introduced into the same from time to time from the tank $b$.

$c^2$, $c^3$, and $c^4$ are spools or bobbins journaled to the frame C and adapted to contain rolls of tar-paper or other saturated fabric.

$c^5$ is a guide-roll journaled to an adjustable frame $c^9$, located in the heating-tank $b$, and provided with a cord $c^{10}$ for raising or lowering the same in order to immerse a sheet or web of tar-paper or other fabric in the liquid contained therein, so as to coat both surfaces thereof.

$e$ is a shaft provided with a pulley $e'$ and supported in journal-boxes $e^2$, attached to the upper surface of the frame C.

E is a segmental or recessed coating-roll keyed or otherwise secured to the shaft $e$ and having a portion of its periphery immersed in the vat $c'$. This roller E may be made in one piece or in sections, and is provided with axial grooves or recesses $e^4$ and with circumferential grooves or recesses $e^5$ for a purpose to be presently described.

$c^6$ are guide-rollers located on opposite sides of the coating-roll E and supported in horizontally-adjustable journal-boxes $c^7$ for permitting of the regulation of the tension of the fabric.

$c^8$ is a guide-roll for turning the partially-coated fabric, so that the uncoated surface thereof will be next to the frame C.

$a^5$ is a table supported by the upper portions of the posts or pillars $c$ and located above and heated by the horizontal portion $a^4$ of the flue $a^2$.

$d$ is a guide-roller journaled to the table $a^5$ and adapted to unite the several sheets and to direct the united fabric to the table $a^5$.

F is a hopper or other receptacle adapted to contain silica and provided with a perforated or sieve like bottom for depositing the silica upon the surface of the fabric while the latter is traversing the table $a^5$, and being maintained in a heated condition by means of the horizontal portion of the flue $a^4$. This hopper F is suspended from the roof or ceiling by means of the links $f'$, and is constrained to oscillate transversely of the machine by means of the guides or ways $f^2$, attached to the vertical shield or wall $f^3$. The wall $f^3$ also serves to prevent the silica from falling into the tank $b$ when the hopper F is being refilled and during the operation of the machine.

$f^4$ is a vertical shaft supported in bearings $f^5$, attached to the side of the machine, and provided at one extremity thereof with a sprocket-wheel $f^6$ and at the other extremity thereof with a crank-arm $f^7$, engaging with a slotted cross-head $f^8$, attached to the hopper F, so that when the shaft $f^4$ is rotated the hopper F is oscillated transversely of the machine, thereby depositing silica upon the surface of the fabric.

$d^2$ is a guide-roller journaled to the table $a^5$ for pressing the silica into the adhesive material.

$d^3$ is a guide-roller supported in journals attached to posts or pillars $d^4$, supported by the frame C. This roller $d^3$ is located nearer to the hopper F than is the roller $d^2$, and the relative positions of these rollers are such that the silica is permitted to fall by gravity from the uncoated portions of the fabric while the latter is being drawn beneath the roll $d^2$ and over the roll $d^3$, as will be readily understood by reference to Fig. 1.

$g$ is a shaft provided with a fast pulley $g'$, a loose pulley $g^2$, a spur-wheel $g^3$, sprocket-wheels $g^4$ and $g^{10}$, and a feed-roller G. This feed-roller G is provided with radial points or spurs $g^5$, adapted to perforate the fabric between the silica-coated portions thereof in order to draw the same through the machine, and is of substantially the same diameter as the coating-roller E, in order to cause the fabric to traverse the machine with a continuous uniform motion.

$g^6$ is a roller supported in bearings attached to the frame C and adapted to retain the fabric in contact with the feed-roll G and to present it to the cutters.

$h$ and $h'$ are superposed shafts supported in bearings $h^2$, attached to the frame C and geared together so as to revolve in opposite directions by means of the spur-wheel $h^3$ and $h^4$. These shafts $h$ and $h'$ are driven by the spur-wheel $g^3$ and are provided with circular knives or cutters $h^5$, having their cutting-edges arranged side by side and slightly overlapped, so that said cutters are adapted to cut the fabric longitudinally and between the coated portions thereof into strips.

$k$ is a block disposed transversely of the machine and adapted to serve as a guide in cutting said strips transversely and between the coated portions thereof into shingles.

$l$ is a blade disposed transversely of the frame C and attached thereto.

$l^2$ is a blade having an inclined cutting-edge $l^3$ and adapted to slide vertically in guides or ways $l^4$, so as to constitute together with the blade $l^2$, a pair of shears.

$l^5$ is a handle-bar pivotally attached by means of a slotted connection $l^6$ to an extension $l^7$ of the guide $l^4$, secured to the frame C, and also attached to the blade $l^2$ by means of the links $l^8$, so that the shears are operated by intermittently raising and lowering the handle-bar $l^6$, whereby the strips of fabric are cut up into shingles.

$a^7$ is a positively-driven belt for transmitting motion to the shaft $g$ and parts connected therewith when the machine is in operation.

$g^8$ is a sprocket-chain passing over the sprocket-wheels $g^4$ and $f^6$ and adapted to rotate the shaft $f^4$ and actuate the hopper F.

$g^9$ is a chain passing over the sprocket-wheels $g^{10}$ and $e'$ in order to prevent the coating-roll E from slipping and in order to drive the coating-roll E and feed-roll G at substantially the same surface velocity, whereby the fabric is drawn through the machine at a uniform rate of speed and is coated at regular intervals in squares or parallelograms.

The mode of operation of the above-described machine in continuously producing multiple-ply silica-coated shingles having one side and the adjacent end thereof provided with uncoated or plain-surfaced marginal edges according to my invention is as follows: A fire is started in the furnace A, which heats up the adhesive material, as pitch, contained in the heating-tank $b$, and the heat of the products of combustion warms the table $a^5$. A certain quantity of the adhesive material in a heated condition is transferred from the tank $b$ into the vat $c'$, so that a portion of the periphery of the coating-roll E is immersed therein. The saturated fabric, as tar-paper $m$, wound around the bobbin $c^4$, is drawn under the guide-rolls $c^6$, and over the coating-roll E. This roll E, by reason of the form or configuration thereof, applies the adhesive material to the sheet $m$ in squares or parallelograms disposed in straight lines with spaces between them, as is clearly indicated by fine parallel lines at $s$ in Fig. 1. The partially-coated sheet $m'$ is then drawn over the guide-roller $c^8$, and is turned over so that the adhesive squares or parallelograms are in proper position to receive the coating of silica. The saturated fabric, as tar-paper $n$, wound around the bobbin $c^3$, is drawn under the immersion-roll $c^5$, located beneath the surface of the heated adhesive material contained in the tank $b$, in order to coat both sides thereof. The sheet $n$, having both sides thereof coated with adhesive material, is then drawn upward out of the tank $b$ and passes over the roller $d$, beneath the sheet $m$, and above the sheet $o$, which latter is drawn directly from the spool or bobbin $c^2$. The three sheets $m$, $n$, and $o$, in passing over the roller $d$, become firmly united and form an integral three-ply fabric $p$, which is drawn across the table $a^5$ and beneath the hopper F. This sheet $p$, in passing across the table $a^5$, is warmed by the waste products of combustion from the furnace A, so that the adhesive material previously applied thereto is maintained in a heated condition, whereby it is especially adapted for the reception of the coating of silica, which latter is continuously deposited upon the surface of the sheet as it travels beneath the hopper F. The silica-coated sheet $q$ (represented at $t$, Fig. 3) is then drawn around the guide-roll $d^2$, which embeds the silica in the adhesive material and firmly attaches it to the sheet. The sheet $q$ is then drawn upward and backward around the roll $d^3$ in order to permit the superfluous silica to fall from the uncoated portions of the sheet upon the portions thereof which are approaching the roller $d^2$. The sheet $q'$, comprising silica-coated squares or parallelograms $u$, Fig. 3, disposed in straight lines and plain-surfaced or uncoated transverse and longitudinal spaces or stripes $w w'$, Fig. 1, is drawn over the positively-driven feed-roll G and beneath the guide-roll $g^6$. This latter roll $g^6$ serves to draw the fabric downward, so that the spurs $g^5$ perforate one of the longitudinal stripes $w$ between the silica-coated squares or parallelograms $u$ and draw the fabric through the machine at a uniform rate of speed. After leaving the guide-roll $g^6$ the fabric $q'$ is advanced toward the cutters $h^5$ and is cut longitudinally and between the silica-coated portions thereof into strips $q^2$. These strips $q^2$ pass over the blade $l$ and beneath the blade $l^2$ toward the block $k$. As soon as the extremities of these strips $q^2$ contact with the block $k$, the former are cut transversely and between the silica-coated squares or parallelograms into shingles by means of the handle-bar $l^5$. The shingles are then removed from between the blades $l$ and $l^2$ and block $k$ in any convenient manner for use.

In some cases it is necessary or desirable to provide silica-coated shingles having an uncoated or plain-surfaced marginal side edge or edges and this result may be readily attained by removing the roller E and employing in lieu thereof a coating-roller provided with circumferential grooves $e^5$, so that the fabric is coated in stripes instead of squares or parallelograms, cutting the fabric longitudinally and between the silica-coated stripes by means of the cutters $h^5$ into strips, and then cutting these strips transversely and through the silica-coated portions thereof into shingles.

It may be remarked that the silica-coated shingles may be provided with uncoated marginal edges on one or more of their sides or ends, as required, by shifting the cutters $h^4$ in one direction or the other and by increasing or diminishing the distance between the block $k$ and blades $l$ and $l^2$, as will be readily understood by an inspection of the drawings.

The above-described machine may be advantageously employed for making multiple-ply plain-surfaced or uncoated shingles. In such case the hopper F is dispensed with or is thrown out of gear in any preferred manner and the sheet $g$ is drawn from the roller $d^2$ directly to the feed-roller G without passing over the roll $d^3$, and is then cut up into shingles in the manner above described.

In the manufacture of single-ply plain or uncoated shingles the saturated fabric, as tar-paper, is drawn from one of the bobbins or spools directly to the feed-roll G, and is then cut up into shingles in the manner hereinabove indicated.

It will be obvious to those skilled in the art to which my invention relates that modifications may be made as to minor details in the construction of the machine without departing from the spirit of the invention. For example, the coating-roll E may be provided with only axial recesses, in which case the finished shingles would be provided with uncoated marginal ends.

Having thus described the nature and objects of my invention, what I claim as new, and desire to secure by Letters Patent, is—

1. In a machine for making fabric shingles, the combination of a feed-roller having spurs, a recessed coating-roll, and means for actuating said rolls with the same surface velocity, substantially as and for the purposes set forth.

2. In a machine for making fabric shingles, the combination of a positively-driven feed-roll having spurs, a coating-roll provided with circumferential recesses, a hopper, cutters, and connected means for operating said hopper, cutters, and feed and coating rolls, substantially as and for the purposes set forth.

3. In a machine for making fabric shingles, the combination of a feed-roll having spurs, a coating-roll having circumferential and axial recesses or grooves, a hopper, cutters, and connected means for operating said feed and coating rolls, hopper, and cutters, substantially as and for the purposes set forth.

4. In a machine for making fabric shingles, the combination of a feed-roll having gripping devices, a recessed coating-roll, a hopper, cutters, connected means for operating said feed and coating rolls, hopper, and cutters, guide-rolls located between said hopper and cutters and superposed one above the other and adapted to permit silica or other material to fall by gravity from uncoated portions of a web or sheets, substantially as set forth.

5. In a machine for making fabric shingles, the combination of positively-driven feeding devices, a coating-roll provided with a recessed perimeter, a hopper, cutters, connected means for operating said feeding devices and coating-roll, hopper, and cutters, and a guide-block, substantially as and for the purposes set forth.

6. In a machine for making fabric shingles, the combination of a positively-driven coating-roll having a recessed or grooved perimeter, a hopper, guide-rolls for directing the fabric beneath the same and turning the fabric to permit superfluous silica to fall therefrom, cutters, a positive feed to cause said fabric to travel in contact with and at the same rate of speed as the perimeter of said coating-roll, and connected means for operating said coating-roll and feed, hopper, and cutters, substantially as set forth.

7. In a machine for making fabric shingles, the combination of a positively-driven coating-roll having a recessed perimeter, a furnace, a table heated by the waste heat of said furnace, a hopper located above said table, guide-rolls superposed one above the other for permitting silica to fall from the partially-coated surface of the web or fabric, and means for drawing the fabric through the machine at a rate of speed equal to the rate of the surface velocity of said coating-roll and for operating said coating-roll, hopper, and cutter, substantially as set forth.

8. In a machine for making fabric shingles, the combination of cutters, a positively-driven feed-roll having spurs, connected means for operating said feed-roll and cutters, and a guide-roll adapted to draw a web or fabric into engagement with said spurs to present the same to the cutters, substantially as and for the purposes set forth.

9. In a machine for making fabric shingles, the combination of a positively-driven recessed coating-roll having means for coating portions of one surface of a fabric with silica and adhesive material, a positively-driven feed-roll having rows of spurs adapted to engage the uncoated portions of said fabric, cutters having overlapping edges and adapted to cut the uncoated portions of said fabric, substantially as and for the purposes set forth.

10. In an apparatus for making silica and other fabric shingles, rolls superposed one above the other therein and adapted to permit the silica or other material to fall by gravity from uncoated portions of a web or sheets, substantially as and for the purposes set forth.

In witness whereof I have hereunto set my signature in the presence of two subscribing witnesses.

HERMANN BORMANN.

Witnesses:
RICHARD C. MAXWELL,
THOMAS M. SMITH.